United States Patent
Chen et al.

(10) Patent No.: US 9,250,755 B2
(45) Date of Patent: Feb. 2, 2016

(54) TOUCH DISPLAY HAVING ADVANCED-FRINGE-FIELD-SWITCHING LIQUID CRYSTAL STRUCTURE

(71) Applicant: Rich IP Technology Inc., Taipei (TW)

(72) Inventors: Han-Chang Chen, Taipei (TW); Yen-Hung Tu, Taipei (TW); Chung-Lin Chia, Taipei (TW); Jen-Chieh Chang, Taipei, TN (US); Chih-Wen Wu, Taipei (TW)

(73) Assignee: Rich IP Technology Inc., Taipei (TW)

( * ) Notice: Subject to any disclaimer, the term of this patent is extended or adjusted under 35 U.S.C. 154(b) by 168 days.

(21) Appl. No.: 14/020,349

(22) Filed: Sep. 6, 2013

(65) Prior Publication Data

US 2014/0362026 A1 Dec. 11, 2014

(30) Foreign Application Priority Data

Jun. 6, 2013 (TW) .............................. 102120157 U

(51) Int. Cl.
*G09G 3/36* (2006.01)
*G06F 3/041* (2006.01)
*G06F 3/045* (2006.01)
*G06F 3/044* (2006.01)

(52) U.S. Cl.
CPC .............. *G06F 3/044* (2013.01); *G06F 3/0412* (2013.01); *G06F 3/0416* (2013.01); *G06F 2203/04112* (2013.01)

(58) Field of Classification Search
CPC ............ G02F 1/1323; G02F 1/133606; G02F 1/133524; G09G 3/3655; G09G 2320/041
See application file for complete search history.

(56) References Cited

U.S. PATENT DOCUMENTS

| | | | |
|---|---|---|---|
| 2010/0253638 A1* | 10/2010 | Yousefpor et al. | 345/173 |
| 2011/0025635 A1* | 2/2011 | Lee | 345/173 |
| 2013/0250225 A1* | 9/2013 | Maeda et al. | 349/143 |
| 2014/0111471 A1* | 4/2014 | Zhao | 345/174 |

* cited by examiner

*Primary Examiner* — Alexander Eisen
*Assistant Examiner* — Nan-Ying Yang
(74) *Attorney, Agent, or Firm* — Ming Chow; Sinorica, LLC

(57) ABSTRACT

A touch display having advanced-fringe-field-switching liquid crystal structure, including a pixel cell and a multiplexer circuit, wherein the multiplexer circuit is used to couple the pixel cell with a source driver unit to provide a fringe-field-switching display function during a display period, and couple the pixel cell with a touch detection unit to provide a touch detection function during a touch detection period.

10 Claims, 13 Drawing Sheets

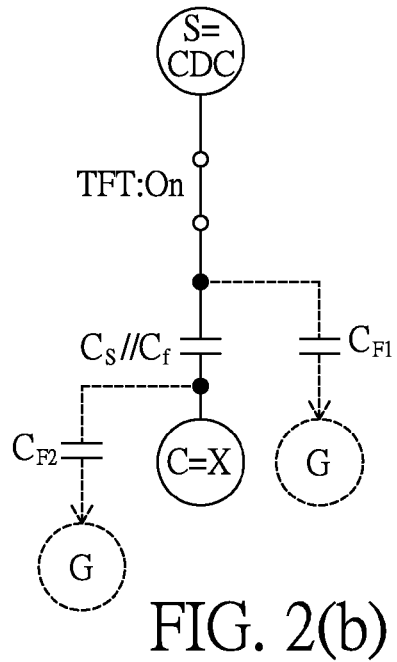
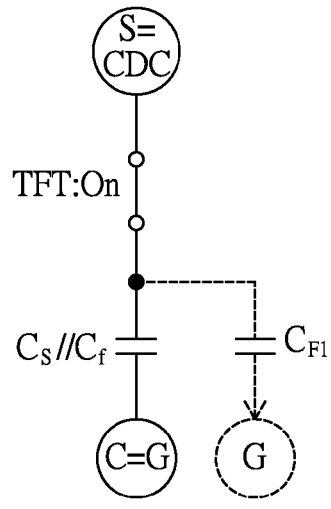
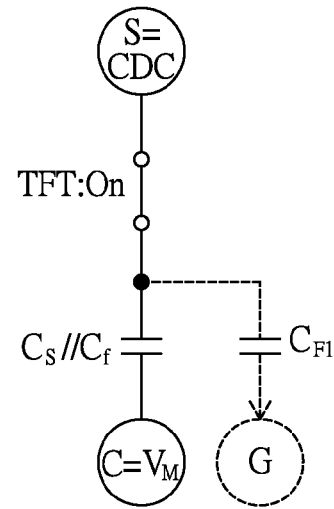
FIG. 2(b)  FIG. 2(c)  FIG. 2(d)
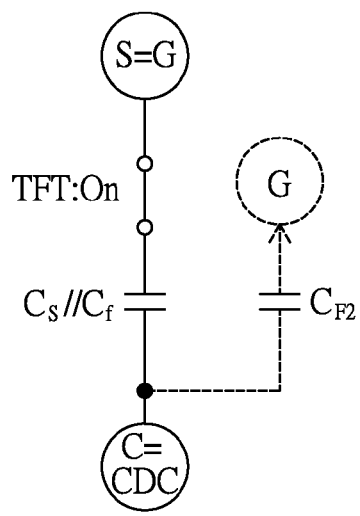
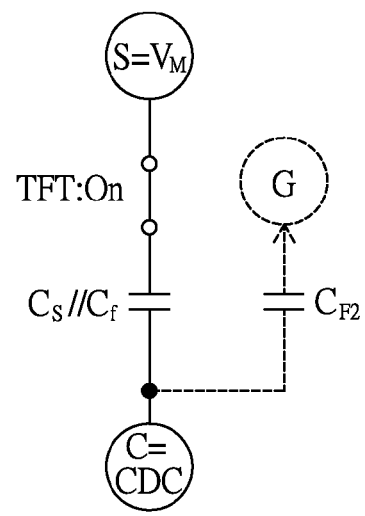
FIG. 2(e)  FIG. 2(f)

TOUCH DISPLAY HAVING ADVANCED-FRINGE-FIELD-SWITCHING LIQUID CRYSTAL STRUCTURE

The current application claims a foreign priority to the patent application of Taiwan No. 102120157 filed on Jun. 6, 2013.

BACKGROUND OF THE INVENTION

1. Field of the Invention

The present invention relates to a touch device, especially to a touch display utilizing AFFS (advanced fringe field switching) liquid crystal structure.

2. Description of the Related Art

General touch screen apparatuses have a touch module stacked on a liquid crystal screen. However, this kind of touch screen apparatuses tends to have larger depths, which can fail to meet the market requirements on lightness and thinness, and can result in higher material cost.

To cope with this issue, one solution is to integrate two layers of same material, of which one layer belongs to a liquid crystal screen and the other layer belongs to a touch module, into a single layer. However, the depth of a touch screen apparatus reduced by this kind of designs still cannot meet the requirements of some high end products.

Another solution is to integrate a touch function into a liquid crystal display, generally by adding extra electrodes on a thin film transistor layer to form touch capacitors. However, this kind of designs tends to reduce product yield rate and increase manufacturing cost.

To solve the foregoing problems, a novel, slim, and easy-to-manufacture touch screen apparatus is needed.

SUMMARY OF THE INVENTION

One objective of the present invention is to disclose a touch display having AFFS liquid crystal structure, which can utilize an AFFS liquid crystal structure to provide a touch function.

Another objective of the present invention is to disclose a touch display having AFFS liquid crystal structure, which can utilize two electrode layers of an AFFS liquid crystal structure to perform a self-capacitor touch detection procedure or a mutual-capacitor touch detection procedure.

Another objective of the present invention is to disclose a touch display having AFFS liquid crystal structure, which can utilize a pixel electrode layer, a counter electrode layer, and a protection electrode layer of an AFFS liquid crystal structure to perform a self-capacitor touch detection procedure or a mutual-capacitor touch detection procedure.

Another objective of the present invention is to disclose a touch display having AFFS liquid crystal structure, which can utilize a voltage bias technique to enhance the reliability of touch detection.

Still another objective of the present invention is to disclose a touch display having AFFS liquid crystal structure, which can simplify the structure of a touch screen to reduce the depth, the yield rate, and the cost thereof.

To attain the foregoing objectives, a touch display having AFFS liquid crystal structure is proposed, which includes a pixel cell and a multiplexer circuit to provide a display function and a touch detection function, the pixel cell including:

a counter electrode located on the first substrate;

a counter electrode connection line coupled electrically with the counter electrode;

an insulation layer located on the counter electrode;

a thin film transistor located on the insulation layer and having a gate, a source, and a drain;

a pixel electrode located on the insulation layer and coupled electrically with the drain;

a gate connection line coupled electrically with the gate;

a source connection line coupled electrically with the source; and a liquid crystal layer located on the thin film transistor, on the pixel electrode, and on the insulation layer; and the multiplexer circuit including:

a first multiplexer having a first contact, a second contact, and a third contact, wherein, the first contact is coupled with the source connection line, the second contact is coupled with a source driver unit, the third contact is coupled with a touch control unit, the first contact is coupled electrically with the second contact during a display period, and the first contact is coupled electrically with the third contact during a touch detection period; and a second multiplexer having a fourth contact, a fifth contact, and a sixth contact, wherein, the fourth contact is coupled with the counter electrode connection line, the fifth contact is coupled with a common voltage, the sixth contact is coupled with the touch control unit, the fourth contact is coupled electrically with the fifth contact during the display period, and the fourth contact is coupled electrically with the sixth contact during the touch detection period.

In one embodiment, the pixel cell further includes:

a protection electrode located on the liquid crystal layer; and a protection electrode connection line coupled electrically with the protection electrode and with the touch control unit.

In one embodiment, the pixel cell further includes a second substrate on the liquid crystal layer.

In one embodiment, the pixel cell further includes a second substrate on the protection electrode.

To attain the foregoing objectives, another touch display having AFFS liquid crystal structure is proposed, including:

a pixel array having plural external source connection lines, plural external gate connection lines, at least one external counter electrode connection line, and plural pixel cells, each of said plural pixel cells including:

a first substrate;

a counter electrode located on the first substrate;

a counter electrode connection line coupled electrically with the counter electrode and with one of the at least one external counter electrode connection line;

an insulation layer located on the counter electrode;

a thin film transistor located on the insulation layer and having a gate, a source, and a drain;

a pixel electrode located on the insulation layer and coupled electrically with the drain;

a gate connection line coupled electrically with the gate and with one of the plural external gate connection lines;

a source connection line coupled electrically with the source and with one of the plural external source connection lines; and a liquid crystal layer located on the thin film transistor, on the pixel electrode, and on the insulation layer;

a gate driver unit coupled with the plural external gate connection lines;

a multiplexer circuit coupled with the plural external source connection lines and with the at least one external counter electrode connection line;

a source driver unit coupled with the multiplexer circuit; and a touch control unit coupled with the multiplexer circuit;

wherein the multiplexer circuit couples the source driver unit with the plural external source connection lines and with the at least one external counter electrode connection line during a display period, and couples the touch control unit with the plural external source connection lines and with the at least one external counter electrode connection line during a touch detection period.

In one embodiment, the touch control unit performs a touch detection procedure during the touch detection period, the touch detection procedure being selected from a group consisting of a self-capacitor touch detection procedure, a mutual-capacitor touch detection procedure, and any combination thereof.

In one embodiment, each of the plural pixel cells further includes a second substrate on the liquid crystal layer.

To attain the foregoing objectives, another touch display having AFFS liquid crystal structure is proposed, including:

a pixel array having plural external source connection lines, plural external gate connection lines, at least one external counter electrode connection line, plural external protection electrode connection lines, and plural pixel cells, each of the plural pixel cells including:

a first substrate;

a counter electrode located on the first substrate;

a counter electrode connection line coupled electrically with the counter electrode and with one of the at least one external counter electrode connection line;

an insulation layer located on the counter electrode;

a thin film transistor located on the insulation layer and having a gate, a source, and a drain;

a pixel electrode located on the insulation layer and coupled electrically with the drain;

a gate connection line coupled electrically with the gate and with one of the plural external gate connection lines;

a source connection line coupled electrically with the source and with one of the plural external source connection lines;

a liquid crystal layer located on the thin film transistor, on the pixel electrode, and on the insulation layer;

a protection electrode located on the liquid crystal layer; and a protection electrode connection line coupled electrically with the protection electrode and with one of the plural external protection electrode connection lines;

a gate driver unit coupled with the plural external gate connection lines;

a multiplexer circuit coupled with the plural external source connection lines, with the plural external protection electrode connection lines, and with the at least one external counter electrode connection line;

a source driver unit coupled with the multiplexer circuit; and a touch control unit coupled with the multiplexer circuit;

wherein the multiplexer circuit couples the plural external protection electrode connection lines with the touch control unit, couples the source driver unit with the plural external source connection lines and with the at least one external counter electrode connection line during a display period, and couples the touch control unit with the plural external source connection lines and with the at least one external counter electrode connection line during a touch detection period.

In one embodiment, the touch control unit performs a touch detection procedure during the touch detection period, the touch detection procedure being selected from a group consisting of a self-capacitor touch detection procedure, a mutual-capacitor touch detection procedure, and any combination thereof.

In one embodiment, each of the plural pixel cells further includes a second substrate on the protection electrode.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 2(b)-2(g) illustrate six embodiments of a self-capacitor touch detection mode of the structure of FIG. 2(a).

DETAILED DESCRIPTION OF THE PREFERRED EMBODIMENTS

The present invention will be described in more detail hereinafter with reference to the accompanying drawings that show the preferred embodiments of the invention.

Figure 1:
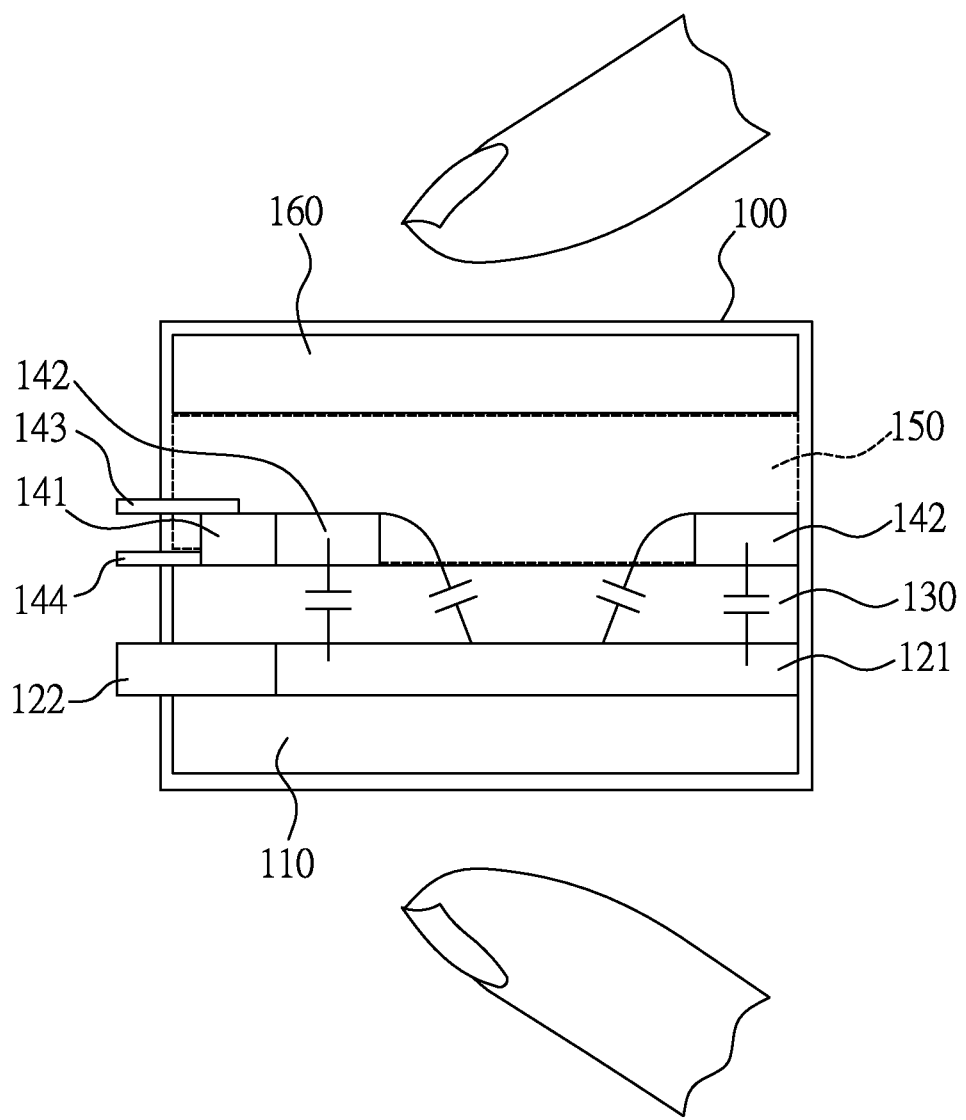
FIG. 1 illustrates the structure of an embodiment of a pixel cell of the present invention.

Please refer to FIG. 1, which illustrates the structure of an embodiment of a pixel cell of the present invention. As illustrated in FIG. 1, a pixel cell 100 includes a first substrate 110, a counter electrode 121, a counter electrode connection line 122, an insulation layer 130, a thin film transistor 141, a pixel electrode 142, a source connection line 143, a gate connection line 144, a liquid crystal layer 150, and a second substrate 160.

The first substrate 110 is preferably a glass substrate for providing a first touch plane.

The counter electrode 121 is located on the first substrate 110, and can be, for example but not limited to, an ITO (Indium Tin Oxide) electrode, a nano-carbon electrode, or a nano-silver electrode.

The counter electrode connection line 122 can be made of, for example but not limited to, metal, and is coupled electrically with the counter electrode 121.

The insulation layer 130 is made of a transparent dielectric material, and located on the counter electrode 121.

The thin film transistor 141 is located on the insulation layer 130 and has a source, a gate, and a drain.

The pixel electrode 142, preferably an ITO electrode, is located on the insulation layer 130 and coupled electrically with the drain. The pixel electrode 142 is a comb-shaped electrode, and two branches of the comb-shaped electrode are illustrated in FIG. 1.

The source connection line 143 can be made of, for example but not limited to, metal, and is coupled electrically with the source.

The gate connection line 144 can be made of, for example but not limited to, metal, and is coupled electrically with the gate.

The liquid crystal layer 150 is located on the thin film transistor 141 and on the pixel electrode 142.

The second substrate 160 is located on the liquid crystal layer 150, and is preferably a glass substrate for providing a second touch plane. That is, the structure of FIG. 1 can provide dual touch planes.

Figure 2A:
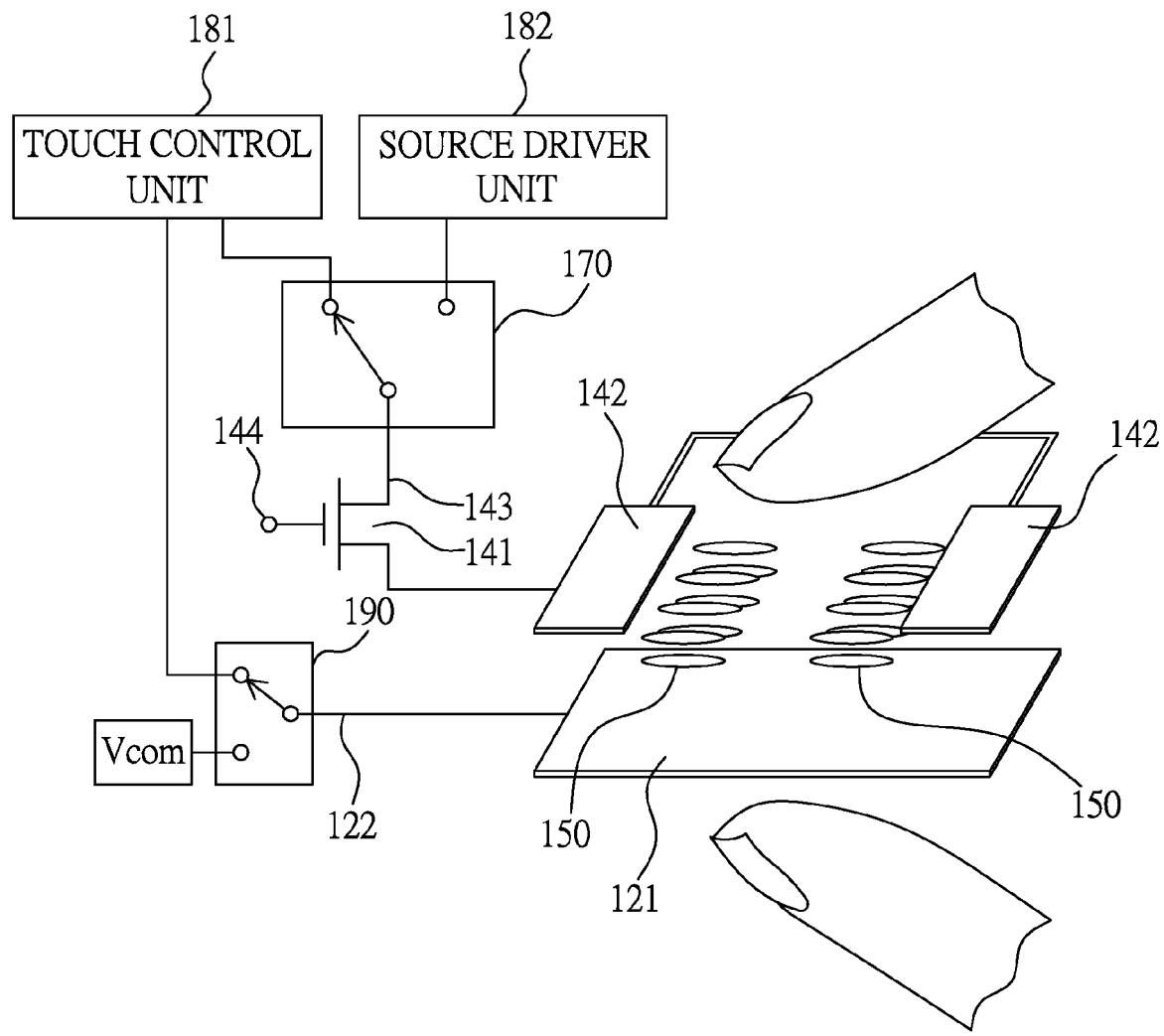
FIG. 2(a) illustrates an embodiment of the touch display having AFFS liquid crystal structure of the present invention.

Please refer to FIG. 2(a), which illustrates an embodiment of the touch display having AFFS liquid crystal structure of the present invention. As illustrated in FIG. 2(a), the touch display has a multiplexer circuit cooperating with the pixel cell of FIG. 1 to provide an AFFS display function and a touch function, the multiplexer circuit including a first multiplexer 170 and a second multiplexer 190.

The first multiplexer 170 has a first contact, a second contact, and a third contact, wherein, the first contact is coupled with the source connection line 143, the second contact is coupled with a source driver unit 182, and the third contact is coupled with a touch control unit 181; and the first contact is coupled electrically with the second contact during a display period, and the first contact is coupled electrically with the third contact during a touch detection period.

The second multiplexer 190 has a fourth contact, a fifth contact, and a sixth contact, wherein, the fourth contact is coupled with the counter electrode connection line 122, the fifth contact is coupled with a common voltage $V_{com}$, and the sixth contact is coupled with the touch control unit 181; and the fourth contact is coupled electrically with the fifth contact during the display period, and the fourth contact is coupled electrically with the sixth contact during the touch detection period.

The structure of FIG. 2(a) can provide a self-capacitor touch detection mode and a mutual-capacitor touch detection mode. Please refer to FIG. 2(b), which illustrates an embodiment of the self-capacitor touch detection mode of the structure of FIG. 2(a). In a capacitor network illustrated in FIG. 2(b), $C_S$ is a capacitor defined by the counter electrode 121 and a bottom face of the pixel electrode 142, $C_f$ is a capacitor defined by the counter electrode 121 and a sidewall of the pixel electrode 142, $C_{F1}$ is a capacitor induced by a finger approaching the pixel electrode 142, and $C_{F2}$ is a capacitor induced by a finger approaching the counter electrode 121. The touch control unit 181 makes the counter electrode connection line 122 floating, and performs a CDC operation on the capacitor network via the source connection line 143 to detect touch events.

FIG. 2(c) illustrates another embodiment of the self-capacitor touch detection mode of the structure of FIG. 2(a). In a capacitor network illustrated in FIG. 2(c), $C_S$ is a capacitor defined by the counter electrode 121 and a bottom face of the pixel electrode 142, $C_f$ is a capacitor defined by the counter electrode 121 and a sidewall of the pixel electrode 142, and $C_{F1}$ is a capacitor induced by a finger approaching the pixel electrode 142. The touch control unit 181 makes the counter electrode connection line 122 coupled to a ground, and performs a CDC operation on the capacitor network via the source connection line 143 to detect touch events.

FIG. 2(d) illustrates another embodiment of the self-capacitor touch detection mode of the structure of FIG. 2(a). In a capacitor network illustrated in FIG. 2(d), $C_S$ is a capacitor defined by the counter electrode 121 and a bottom face of the pixel electrode 142, $C_f$ is a capacitor defined by the counter electrode 121 and a sidewall of the pixel electrode 142, and $C_{F1}$ is a capacitor induced by a finger approaching the pixel electrode 142. The touch control unit 181 couples the counter electrode connection line 122 with a minor voltage, and performs a CDC operation on the capacitor network via the source connection line 143 to detect touch events, wherein the mirror voltage is generated according to the voltage on the pixel electrode 142.

FIG. 2(e) illustrates another embodiment of the self-capacitor touch detection mode of the structure of FIG. 2(a). In a capacitor network illustrated in FIG. 2(e), $C_S$ is a capacitor defined by the counter electrode 121 and a bottom face of the pixel electrode 142, $C_f$ is a capacitor defined by the counter electrode 121 and a sidewall of the pixel electrode 142, and $C_{F2}$ is a capacitor induced by a finger approaching the counter electrode 121. The touch control unit 181 couples the source connection line 143 to a ground, and performs a CDC operation on the capacitor network via the counter electrode connection line 122 to detect touch events.

FIG. 2(f) illustrates another embodiment of the self-capacitor touch detection mode of the structure of FIG. 2(a). In a capacitor network illustrated in FIG. 2(f), $C_S$ is a capacitor defined by the counter electrode 121 and a bottom face of the pixel electrode 142, $C_f$ is a capacitor defined by the counter electrode 121 and a sidewall of the pixel electrode 142, and $C_{F2}$ is a capacitor induced by a finger approaching the counter electrode 121. The touch control unit 181 couples the source connection line 143 to a mirror voltage, and performs a CDC operation on the capacitor network via the counter electrode connection line 122 to detect touch events, wherein the mirror voltage is generated according to the voltage on the counter electrode 121.

Figure 2G:
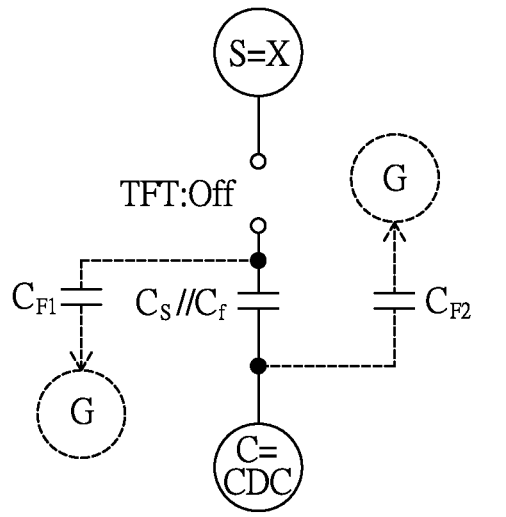

FIG. 2(g) illustrates still another embodiment of the self-capacitor touch detection mode of the structure of FIG. 2(a). In a capacitor network illustrated in FIG. 2(g), $C_S$ is a capacitor defined by the counter electrode 121 and a bottom face of the pixel electrode 142, $C_f$ is a capacitor defined by the counter electrode 121 and a sidewall of the pixel electrode 142, $C_{F1}$ is a capacitor induced by a finger approaching the pixel electrode 142, and $C_{F2}$ is a capacitor induced by a finger approaching the counter electrode 121. The touch control unit 181 makes the source connection line 143 floating, and performs a CDC operation on the capacitor network via the counter electrode connection line 122 to detect touch events.

Figure 2H:
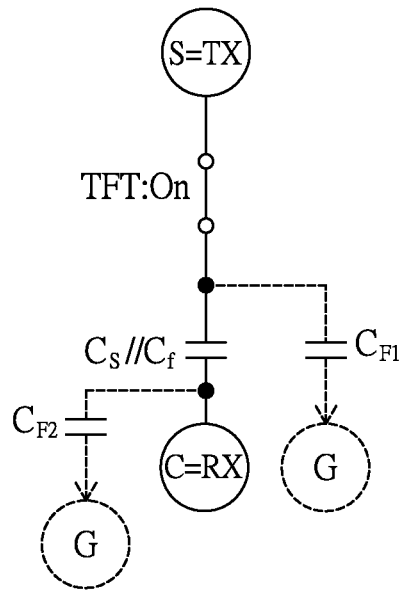
FIG. 2(h)-2(i) illustrate two embodiments of a mutual-capacitor touch detection mode of the structure of FIG. 2(a).

FIG. 2(h) illustrates an embodiment of the mutual-capacitor touch detection mode of the structure of FIG. 2(a). In a capacitor network illustrated in FIG. 2(h), $C_S$ is a capacitor defined by the counter electrode 121 and a bottom face of the pixel electrode 142, $C_f$ is a capacitor defined by the counter electrode 121 and a sidewall of the pixel electrode 142, $C_{F1}$ is a capacitor induced by a finger approaching the pixel electrode 142, and $C_{F2}$ is a capacitor induced by a finger approaching the counter electrode 121. The touch control unit 181 uses the source connection line 143 as a signal transmitting end TX, and the counter electrode connection line 122 as a signal receiving end RX to detect touch events. When $C_{F1}$ and $C_{F2}$ are induced during a touch operation, the amplitude of the signal at the signal receiving end RX will be reduced by a voltage division circuit consisting of $C_{F1}$ and $C_{F2}$. Accordingly, the touch control unit 181 can therefore detect the touch operation.

Figure 2I:
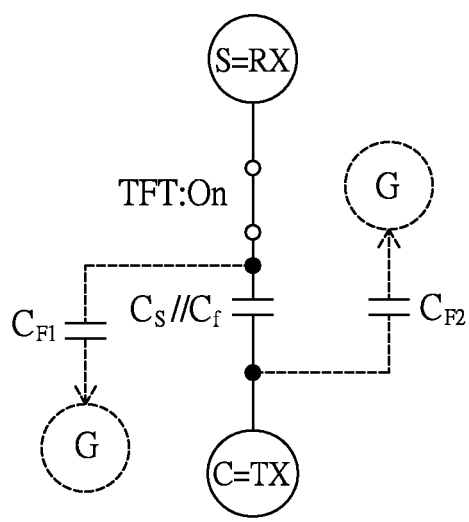

FIG. 2(i) illustrates another embodiment of the mutual-capacitor touch detection mode of the structure of FIG. 2(a). In a capacitor network illustrated in FIG. 2(i), $C_S$ is a capacitor defined by the counter electrode 121 and a bottom face of the pixel electrode 142, $C_f$ is a capacitor defined by the counter electrode 121 and a sidewall of the pixel electrode 142, $C_{F1}$ is a capacitor induced by a finger approaching the pixel electrode 142, and $C_{F2}$ is a capacitor induced by a finger approaching the counter electrode 121. The touch control unit 181 uses the counter electrode connection line 122 as a signal transmitting end TX, and the source connection line 143 as a signal receiving end RX to detect touch events. When $C_{F1}$ and $C_{F2}$ are induced during a touch operation, the amplitude of the signal at the signal receiving end RX will be reduced by a voltage division circuit consisting of $C_{F1}$ and $C_{F2}$. Accordingly, the touch control unit 181 can therefore detect the touch operation.

Figure 3:
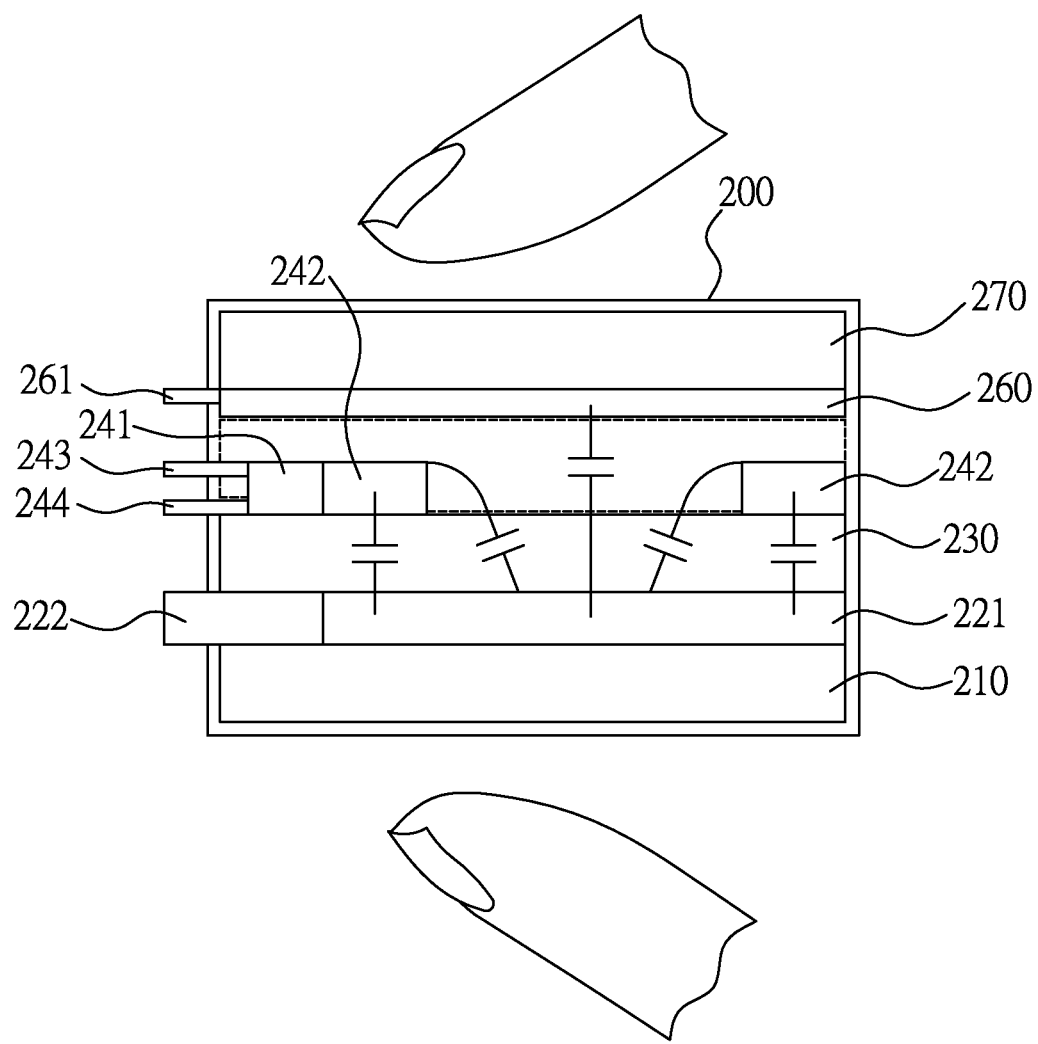
FIG. 3 illustrates the structure of another embodiment of the pixel cell of the present invention.

Please refer to FIG. 3, which illustrates the structure of another embodiment of the pixel cell of the present invention. As illustrated in FIG. 3, a pixel cell 200 includes a first substrate 210, a counter electrode 221, a counter electrode connection line 222, an insulation layer 230, a thin film transistor 241, a pixel electrode 242, a source connection line 243, a gate connection line 244, a liquid crystal layer 250, a protection electrode 260, a protection electrode connection line 261, and a second substrate 270.

The first substrate 210, preferably a glass substrate, provides a first touch plane.

The counter electrode 221 is located on the first substrate and can be, for example but not limited to, an ITO electrode, a nano-carbon electrode, or a nano-silver electrode.

The counter electrode connection line 222 can be made of, for example but not limited to, metal, and is coupled electrically with the counter electrode 221.

The insulation layer 230 is made of a transparent dielectric material and located on the counter electrode 221.

The thin film transistor 241 is located on the insulation layer 230 and has a source, a gate, and a drain.

The pixel electrode 242, preferably an ITO electrode, is located on the insulation layer 230 and coupled electrically with the drain. The pixel electrode 242 is a comb-shaped electrode, and two branches of the comb-shaped electrode are illustrated in FIG. 3.

The source connection line 243 can be made of, for example but not limited to, metal, and is coupled electrically with the source.

The gate connection line 244 can be made of, for example but not limited to, metal, and is coupled electrically with the gate.

The liquid crystal layer 250 is located on the thin film transistor 241 and on the pixel electrode 242.

The protection electrode 260, being a transparent electrode, is located on the liquid crystal layer 250 and can be made of ITO.

The protection electrode connection line 261 can be made of, for example but not limited to, metal, and is coupled electrically with the protection electrode 260.

The second substrate 270, preferably a glass substrate, is located on the protection electrode 260 for providing a second touch plane. That is, the structure of FIG. 3 can provide dual touch planes. In addition, although the protection electrode 260 is located below the second substrate 270 in FIG. 3, however, the protection electrode 260 can also be located above the second substrate 270.

Figure 4A:
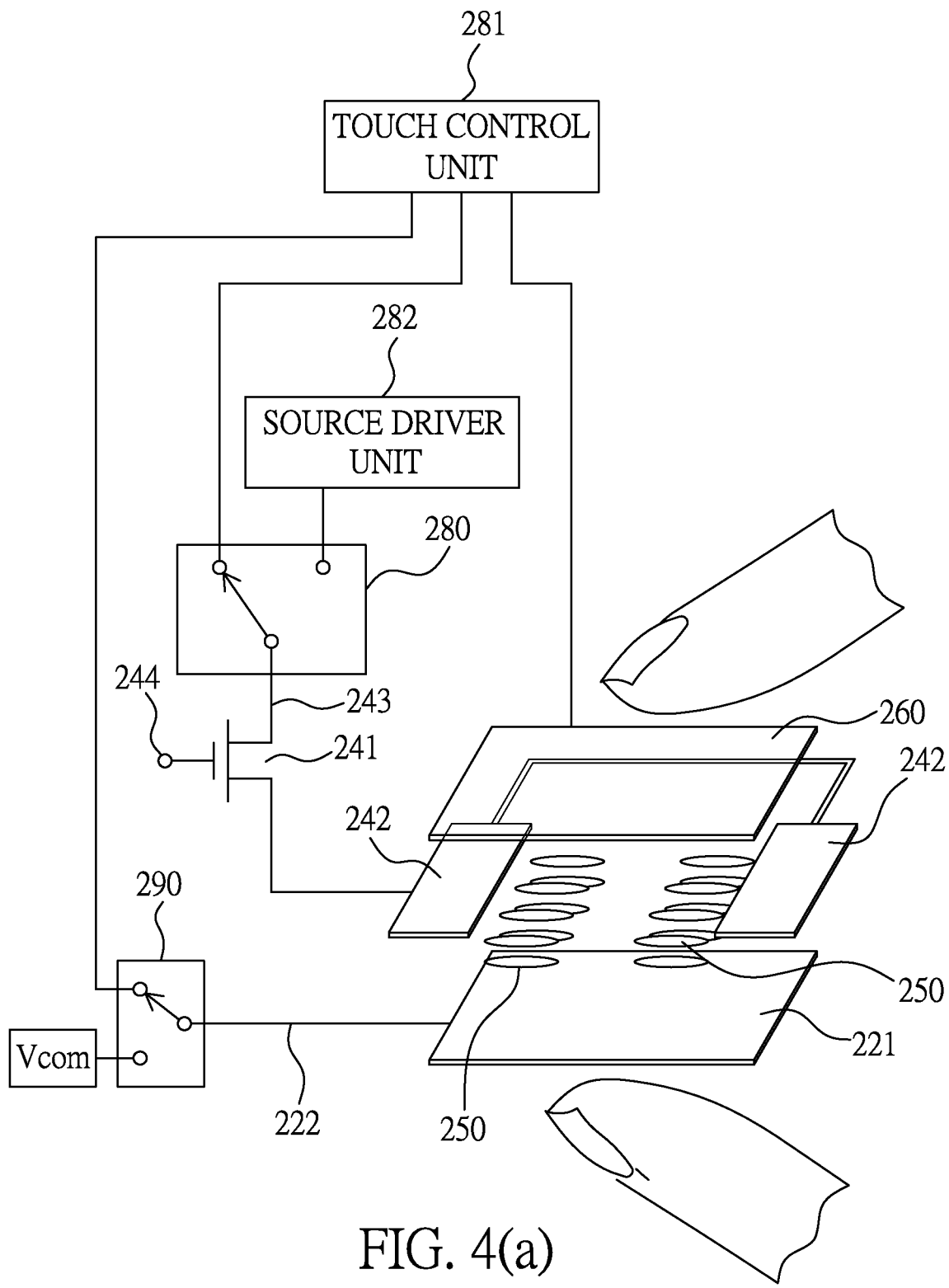
FIG. 4(a) illustrates another embodiment of the touch display having AFFS liquid crystal structure of the present invention.

Please refer to FIG. 4(a), which illustrates another embodiment of the touch display having AFFS liquid crystal structure of the present invention. As illustrated in FIG. 4(a), the touch display has a multiplexer circuit cooperating with the pixel cell of FIG. 3 to provide an AFFS display function and a touch function, the multiplexer circuit including a first multiplexer 280 and a second multiplexer 290.

The first multiplexer 280 has a first contact, a second contact, and a third contact, wherein, the first contact is coupled with the source connection line 243, the second contact is coupled with a source driver unit 282, and the third contact is coupled with a touch control unit 281; and the first contact is coupled electrically with the second contact during a display period, and the first contact is coupled electrically with the third contact during a touch detection period.

The second multiplexer 290 has a fourth contact, a fifth contact, and a sixth contact, wherein, the fourth contact is coupled with the counter electrode connection line 222, the fifth contact is coupled with a common voltage $V_{com}$, and the sixth contact is coupled with the touch control unit 281; and the fourth contact is coupled electrically with the fifth contact during the display period, and the fourth contact is coupled electrically with the sixth contact during the touch detection period.

Besides, the protection electrode connection line 261 is coupled with the touch control unit 281 to provide both an ESD (electrostatic discharge) path and a touch detection path.

Figure 4B:
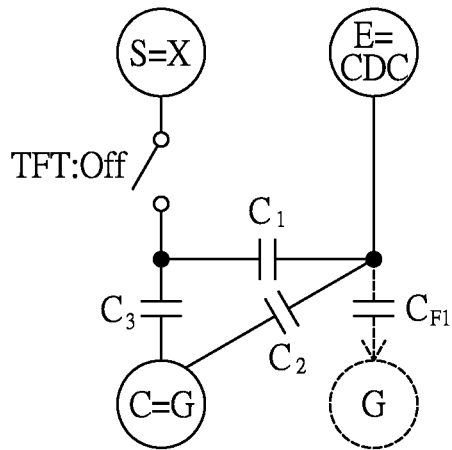
FIG. 4(b)-4(g) illustrate six embodiments of the self-capacitor touch detection mode of the structure of FIG. 4(a).

The structure of FIG. 4(a) can provide a self-capacitor touch detection mode and a mutual-capacitor touch detection mode. Please refer to FIG. 4(b), which illustrates an embodiment of the self-capacitor touch detection mode of the structure of FIG. 4(a). As illustrated in FIG. 4(b), a capacitor network for touch detection is formed by making the source connection line 243 floating, the protection electrode connection line 261 coupled with a CDC (charge-to-digital conversion) unit, and the counter electrode connection line 222 coupled to a ground.

Figure 4C:
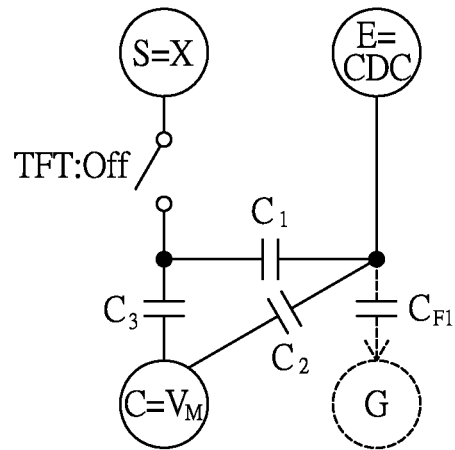

FIG. 4(c) illustrates another embodiment of the self-capacitor touch detection mode of the structure of FIG. 4(a). As illustrated in FIG. 4(c), a capacitor network for touch detection is formed by making the source connection line 243 floating, the protection electrode connection line 261 coupled with a CDC (charge-to-digital conversion) unit, and the counter electrode connection line 222 coupled with a minor voltage, wherein the mirror voltage is generated according to the voltage on the protection electrode connection line 261, and is used to disable a capacitor defined by the protection electrode 260 and the counter electrode 221, so as to enhance a capacitance change rate of a touch operation. When the difference between the effective capacitance with a touch event and the effective capacitance without a touch event increases, the reliability of touch detection will increase accordingly.

Figure 4D:
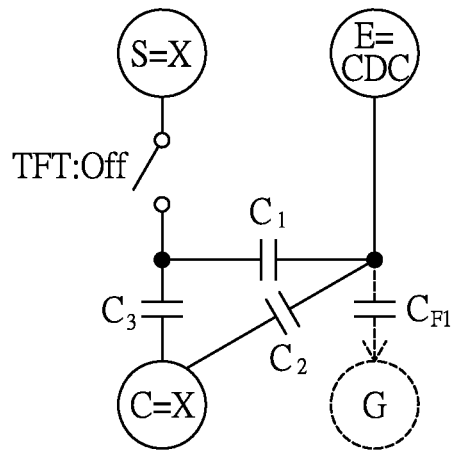

FIG. 4(d) illustrates another embodiment of the self-capacitor touch detection mode of the structure of FIG. 4(a). As illustrated in FIG. 4(d), a capacitor network for touch detection is formed by making the source connection line 243 floating, the protection electrode connection line 261 coupled with a CDC (charge-to-digital conversion) unit, and the counter electrode connection line 222 floating.

Figure 4E:
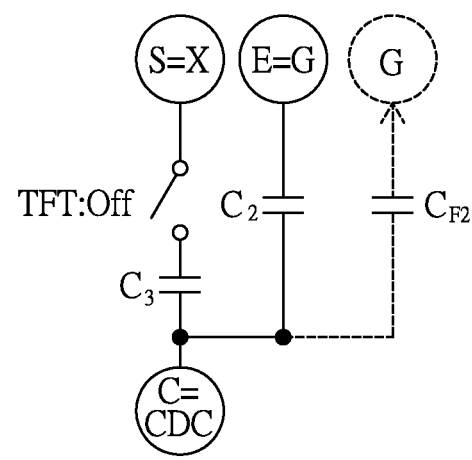

FIG. 4(e) illustrates another embodiment of the self-capacitor touch detection mode of the structure of FIG. 4(a). As illustrated in FIG. 4(e), a capacitor network for touch detection is formed by making the source connection line 243 floating, the counter electrode connection line 222 coupled with a CDC (charge-to-digital conversion) unit, and the protection electrode connection line 261 coupled to a ground.

Figure 4F:
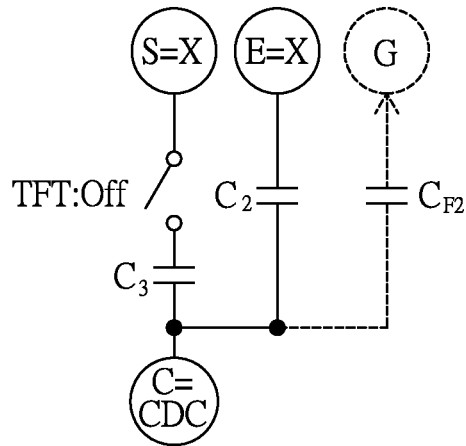

FIG. 4(f) illustrates another embodiment of the self-capacitor touch detection mode of the structure of FIG. 4(a). As illustrated in FIG. 4(f), a capacitor network for touch detection is formed by making the source connection line 243 floating, the counter electrode connection line 222 coupled with a CDC (charge-to-digital conversion) unit, and the protection electrode connection line 261 floating.

Figure 4G:
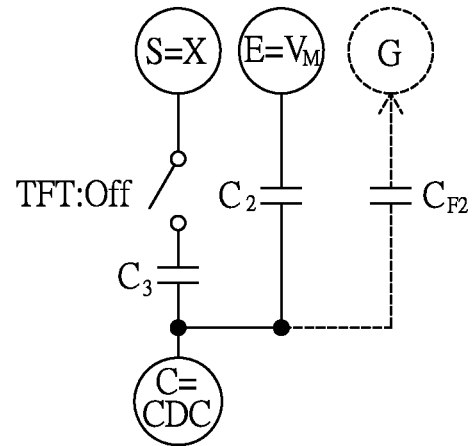

FIG. 4(g) illustrates still another embodiment of the self-capacitor touch detection mode of the structure of FIG. 4(a). As illustrated in FIG. 4(g), a capacitor network for touch detection is formed by making the source connection line 243 floating, the counter electrode connection line 222 coupled with a CDC (charge-to-digital conversion) unit, and the protection electrode connection line 261 coupled with a mirror voltage, wherein the minor voltage is generated according to the voltage on the counter electrode connection line 222, and is used to disable a capacitor defined by the protection electrode 260 and the counter electrode 221, so as to enhance a capacitance change rate of a touch operation.

Figure 4H:
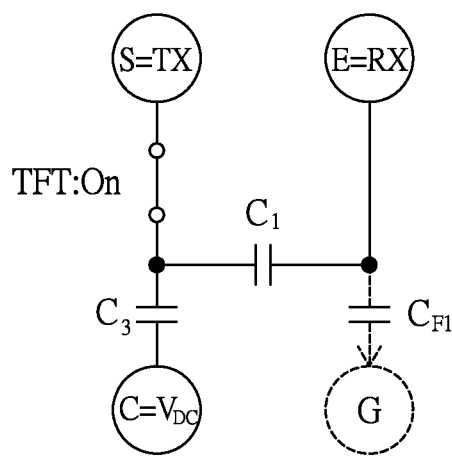
FIG. 4(h)-4(k) illustrate four embodiments of the mutual-capacitor touch detection mode of the structure of FIG. 4(a).

FIG. 4(h) illustrates an embodiment of the mutual-capacitor touch detection mode of the structure of FIG. 4(a). As illustrated in FIG. 4(h), a capacitor network for touch detection is formed by making the source connection line 243 as a signal transmitting end TX, the protection electrode connection line 261 as a signal receiving end RX, and the counter electrode connection line 222 coupled with a DC voltage.

Figure 4I:
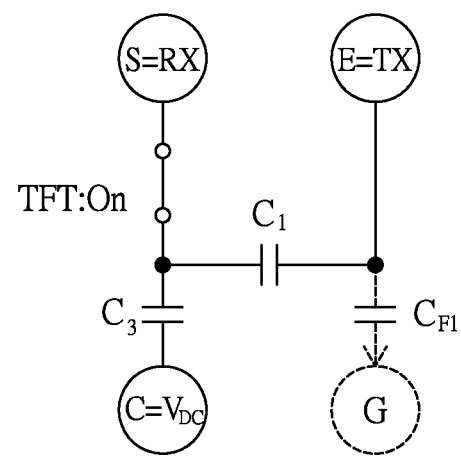

FIG. 4(i) illustrates an embodiment of the mutual-capacitor touch detection mode of the structure of FIG. 4(a). As illustrated in FIG. 4(i), a capacitor network for touch detection is formed by making the protection electrode connection line 261 as a signal transmitting end TX, the source connection line 243 as a signal receiving end RX, and the counter electrode connection line 222 coupled with a DC voltage.

Figure 4J:
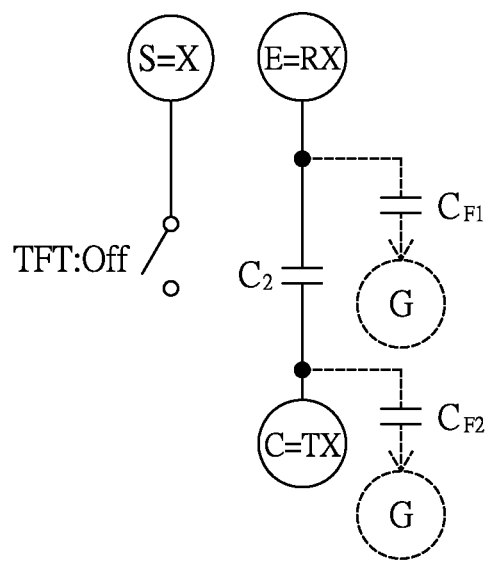

FIG. 4(j) illustrates an embodiment of the mutual-capacitor touch detection mode of the structure of FIG. 4(a). As illustrated in FIG. 4(j), a capacitor network for touch detection is formed by switching off the thin film transistor 241, making the counter electrode connection line 222 as a signal transmitting end TX, and the protection electrode connection line 261 as a signal receiving end RX.

Figure 4K:
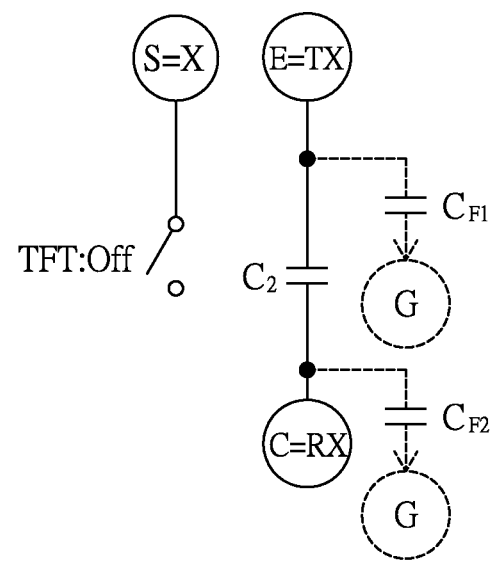

FIG. 4(k) illustrates an embodiment of the mutual-capacitor touch detection mode of the structure of FIG. 4(a). As illustrated in FIG. 4(k), a capacitor network for touch detection is formed by switching off the thin film transistor 241, making the protection electrode connection line 261 as a signal transmitting end TX, and the counter electrode connection line 222 as a signal receiving end RX.

Figure 5A:
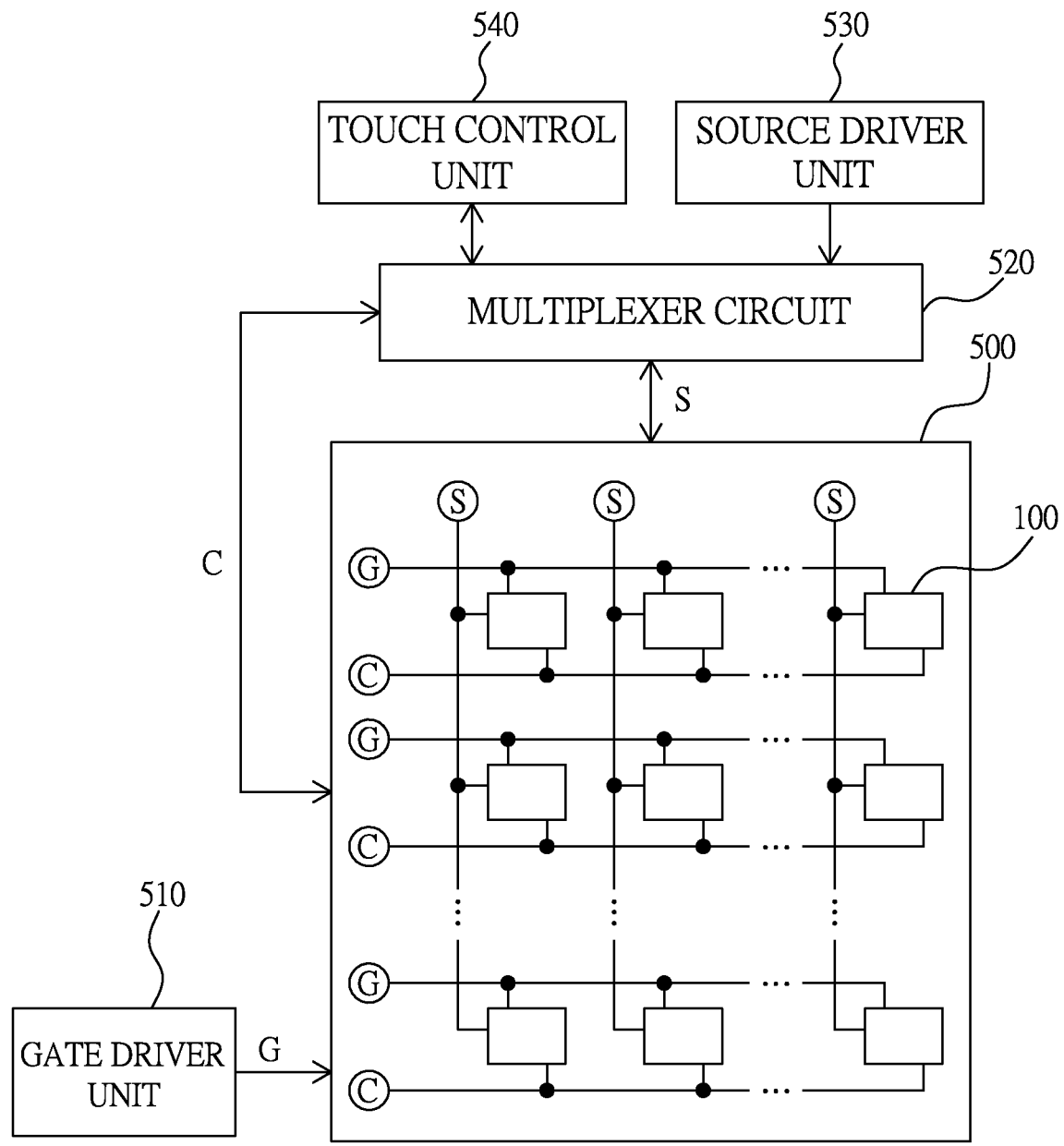
FIG. 5(a) illustrates another embodiment of the touch display having AFFS liquid crystal structure of the present invention.

Please refer to FIG. 5(a), which illustrates another embodiment of the touch display having AFFS liquid crystal structure of the present invention. As illustrated in FIG. 5(a), the touch display includes a pixel array 500, a gate driver unit 510, a multiplexer circuit 520, a source driver unit 530, and a touch control unit 540.

The pixel array 500 includes plural external source connection lines S, plural external gate connection lines G, at least one external counter electrode connection line C, and plural pixel cells 100, wherein each of the plural pixel cells 100 (please refer to FIG. 1) includes: a first substrate 110; a counter electrode 121 located on the first substrate 110; a counter electrode connection line 122 coupled electrically with the counter electrode 121 and with one of the at least one external counter electrode connection line C; an insulation layer 130 located on the counter electrode 121; a thin film transistor 141 located on the insulation layer 130 and having a gate, a source, and a drain; a pixel electrode 142, being a comb-shaped electrode located on the insulation layer 130 and coupled electrically with the drain; a gate connection line 144 coupled electrically with the gate and with one of the plural external gate connection lines G; a source connection line 143 coupled electrically with the source and with one of the plural external source connection lines S; a liquid crystal layer 150 located on the thin film transistor 141 and on the pixel electrode 142; and a second substrate 160 located on the liquid crystal layer 150.

The gate driver unit 510 is coupled with the plural external gate connection lines G.

The multiplexer circuit 520 is coupled with the plural external source connection lines S and with the at least one external counter electrode connection line C.

The source driver unit 530 is coupled with the multiplexer circuit 520.

The touch control unit 540 is coupled with the multiplexer circuit 520.

When in operation, the multiplexer circuit 520 couples the source driver unit 530 with the plural external source connection lines S and with the at least one external counter electrode connection line C during a display period, and couples the touch control unit 540 with the plural external source connection lines S and with the at least one external counter electrode connection line C during a touch detection period; and the touch control unit 540 performs a touch detection procedure during the touch detection period, the touch detection procedure being selected from a group consisting of a self-capacitor touch detection procedure, a mutual-capacitor touch detection procedure, and any combination thereof.

Figure 5B:
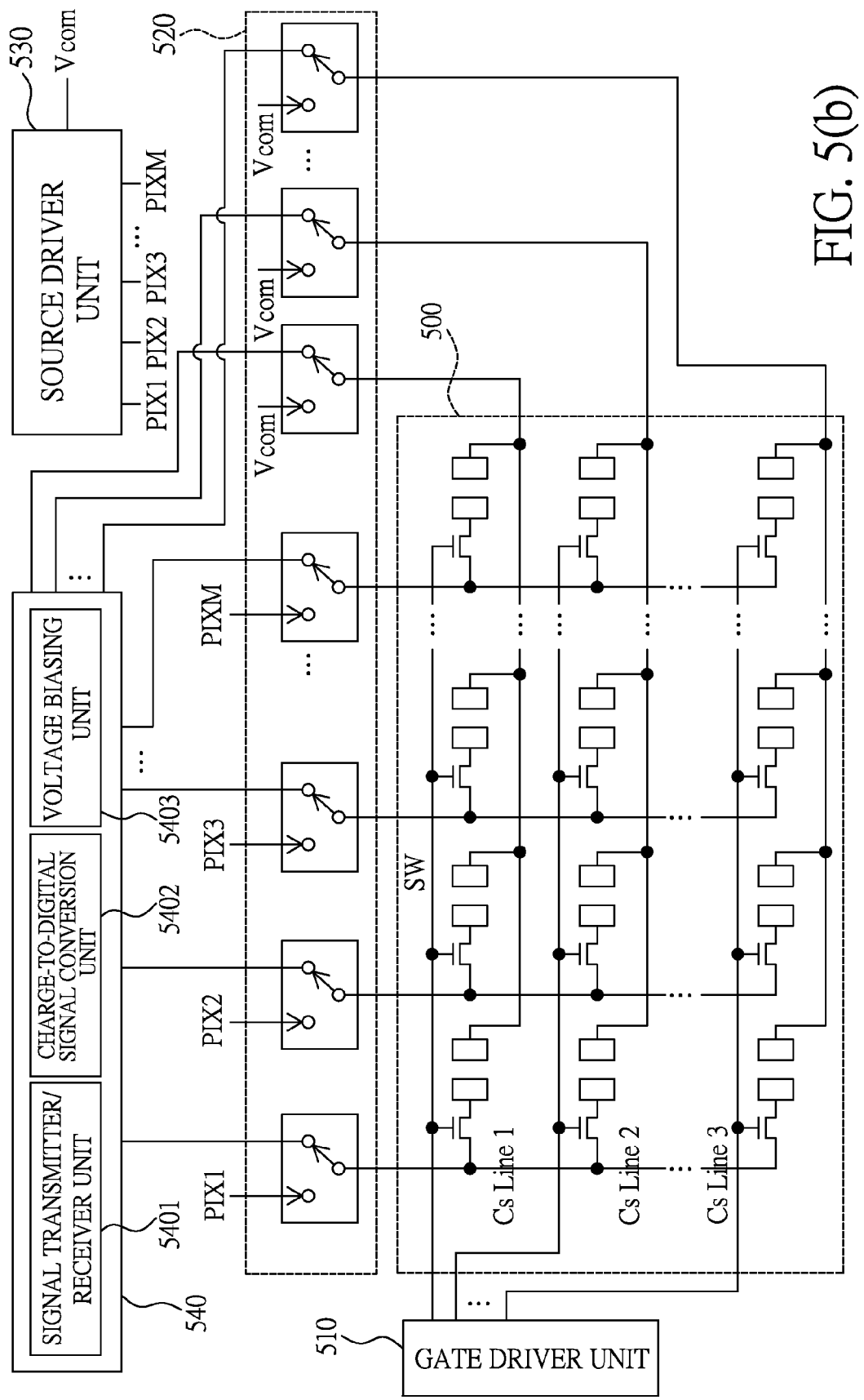
FIG. 5(b) illustrates a detailed diagram of FIG. 5(a).

FIG. 5(b) illustrates a detailed diagram of FIG. 5(a), wherein the touch control unit 540 has a signal transmitter/receiver unit 5401, a charge-to-digital signal conversion unit 5402, and a voltage biasing unit 5403, wherein, the signal transmitter/receiver unit 5401 is used to perform the mutual-capacitor touch detection procedure, the charge-to-digital signal conversion unit 5402 is used to perform the self-capacitor touch detection procedure, and the voltage biasing unit 5403 is used to disable a specific capacitor (or capacitors). For example, when the voltage biasing unit 5403 provides a voltage for the pixel array 500 equal to a voltage provided by the signal transmitter/receiver unit 5401 for the pixel array 500, there will be no current flowing in the capacitor defined by the pixel electrode 142 and the counter electrode 121, that is, the capacitor defined by the pixel electrode 142 and the counter electrode 121 will be disabled. During the touch operation, the capacitance induced by a finger is not a large quantity, so, if the effective capacitance of the pixel array 500 can be reduced, the reliability of touch detection will increase accordingly.

Figure 6:
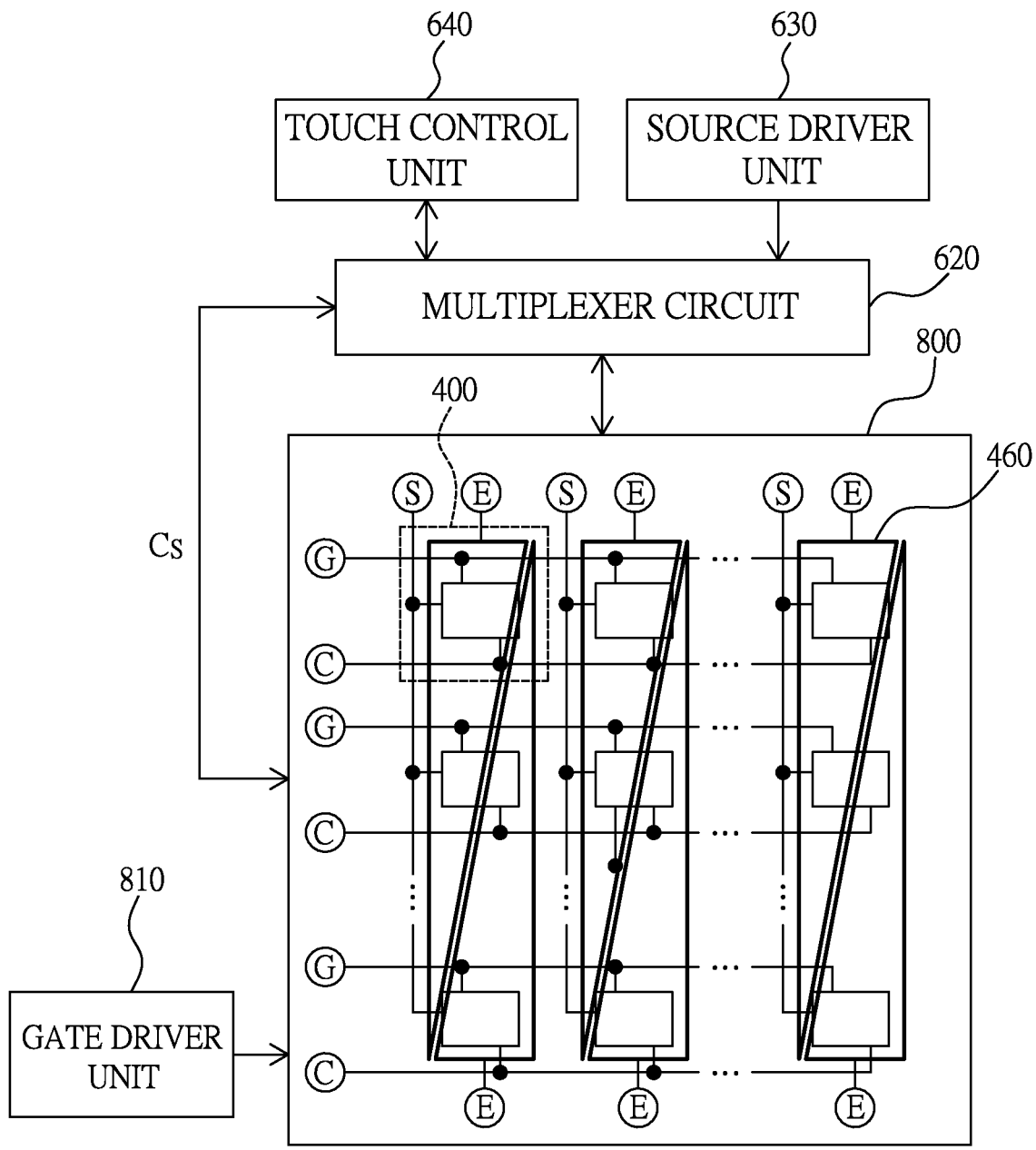
FIG. 6 illustrates another embodiment of the touch display having AFFS liquid crystal structure of the present invention.

Please refer to FIG. 6, which illustrates another embodiment of the touch display having AFFS liquid crystal structure of the present invention. As illustrated in FIG. 6, the touch display includes a pixel array 600, a gate driver unit 610, a multiplexer circuit 620, a source driver unit 630, and a touch control unit 640.

Figure 7B:
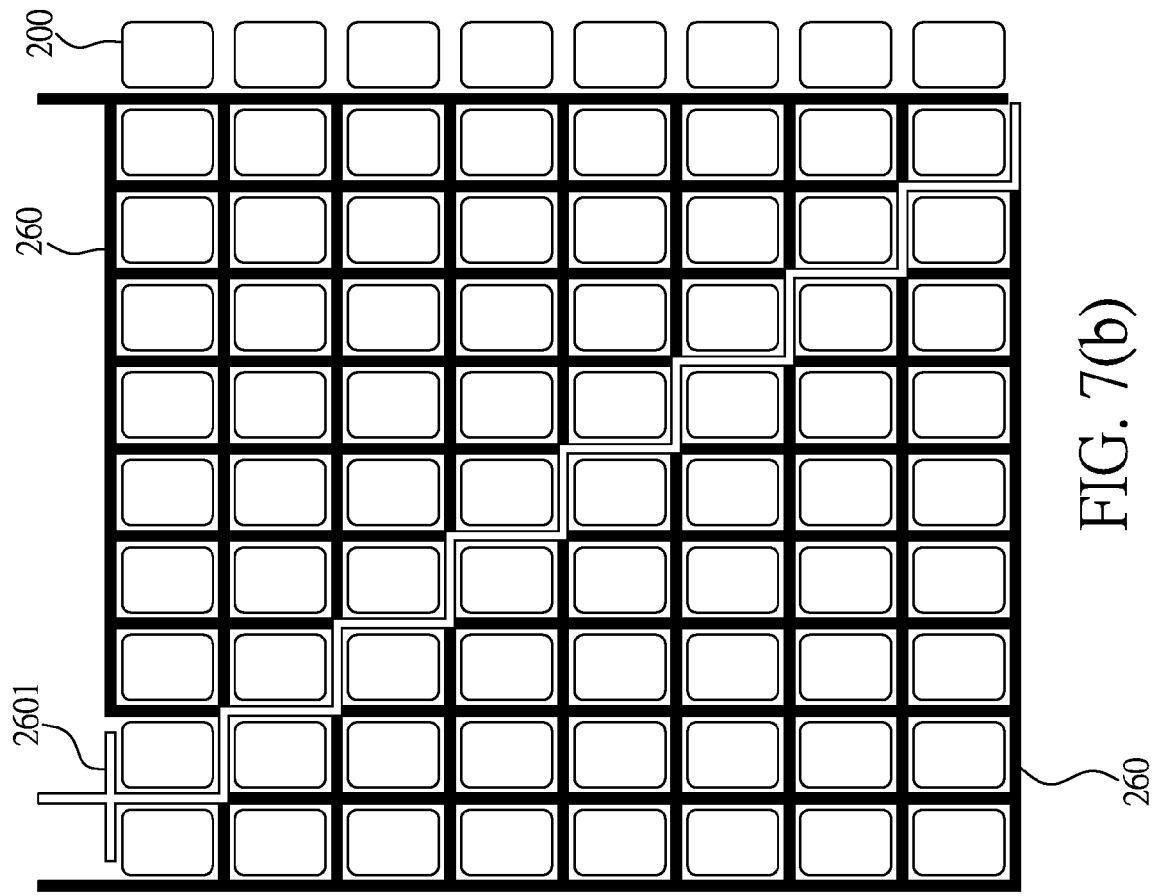
FIG. 7(a)-7(b) illustrates two embodiments of protection electrodes of FIG. 3.
Figure 7A:
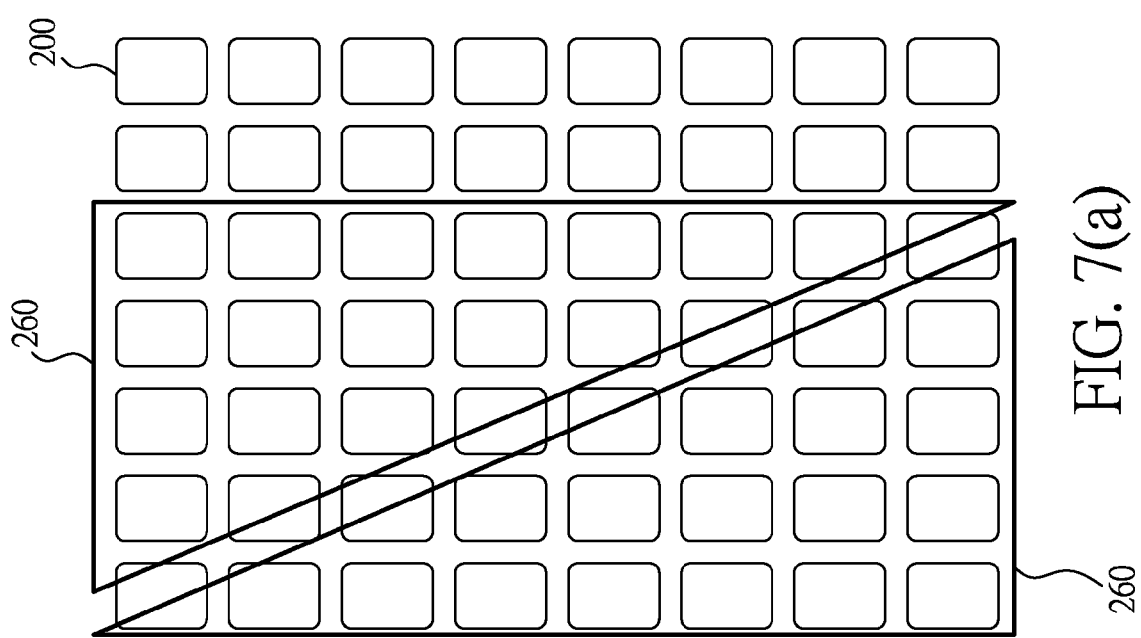

The pixel array 600 includes plural external source connection lines S, plural external gate connection lines G, at least one external counter electrode connection line C, plural external protection electrode connection lines E, and plural pixel cells 200, wherein each of the plural pixel cells 200 (please refer to FIG. 3) includes: a first substrate 210; a counter electrode 221 located on the first substrate 210; a counter electrode connection line 222 coupled electrically with the counter electrode 221 and with one of the at least one external counter electrode connection line C; an insulation layer 230 located on the counter electrode 221; a thin film transistor 241 located on the insulation layer 230 and having a gate, a source, and a drain; a pixel electrode 242 located on the insulation layer 230 and coupled electrically with the drain, the pixel electrode 242 being a comb-shaped electrode; a gate connection line 244 coupled electrically with the gate and with one of the plural external gate connection lines G; a source connection line 243 coupled electrically with the source and with one of the plural external source connection lines S; a liquid crystal layer 250 located on the thin film transistor 241 and on the pixel electrode 242; a protection electrode 260 located on the liquid crystal layer 250; a protection electrode connection line 261 coupled electrically with the protection electrode 260 and with one of the plural external protection electrode connection lines E; and a second substrate 270 located on the protection electrode 260. In addition, although the protection electrode 260 is located below the second substrate 270 in FIG. 3, however, the protection electrode 260 can also be located above the second substrate 270, and can be aligned in rows or columns, or in any skewed direction, and have the shape of long rectangle, triangle, etc. Please refer to FIG. 7(a)-7(b), which illustrates two embodiments of the protection electrodes 260 of FIG. 3. In FIG. 7(a), the protection electrodes 260 are made of triangular ITO electrodes. In FIG. 7(b), the protection electrodes 260 are made of mesh conductor, and two adjacent protection electrodes 260 are isolated from each other by an insulator 2601.

The gate driver unit 610 is coupled with the plural external gate connection lines G.

The multiplexer circuit 620 is coupled with the plural external source connection lines S, with the at least one external counter electrode connection line C, and with the plural external protection electrode connection lines E.

The source driver unit 630 is coupled with the multiplexer circuit 620.

The touch control unit 640 is coupled with the multiplexer circuit 620.

When in operation, the multiplexer circuit 620 couples the plural external protection electrode connection lines E with the touch control unit 640; couples the source driver unit 630 with the plural external source connection lines S and with the at least one external counter electrode connection line C during a display period; and couples the touch control unit 640 with the plural external source connection lines S and with the at least one external counter electrode connection line C during a touch detection period. The touch control unit 640 performs a touch detection procedure during the touch detection period, the touch detection procedure being selected from a group consisting of a self-capacitor touch detection procedure, a mutual-capacitor touch detection procedure, and any combination thereof.

Like the touch control unit 540 in FIG. 5(b), the touch control unit 640 also has a signal transmitter/receiver unit, a charge-to-digital signal conversion unit, and a voltage biasing unit (not illustrated in the figure), wherein, the charge-to-digital signal conversion unit is used to perform the self-capacitor touch detection procedure, the signal transmitter/receiver unit is used to perform the mutual-capacitor touch detection procedure, and the voltage biasing unit is used to disable a specific capacitor (capacitors). As the operation principle of the touch control unit 640 has been elaborated in the specification of FIG. 5(b), it will not be readdressed here.

Thanks to the novel designs mentioned above, the present invention possesses the following advantages:

1. The touch display of the present invention is capable of utilizing an AFFS liquid crystal structure to provide a touch function.

2. The touch display of the present invention is capable of utilizing two electrodes of an AFFS liquid crystal structure to perform a self-capacitor touch detection procedure or a mutual-capacitor touch detection procedure.

3. The touch display of the present invention is capable of utilizing a pixel electrode layer, a counter electrode layer, and a protection electrode layer of an AFFS liquid crystal structure to perform a self-capacitor touch detection procedure or a mutual-capacitor touch detection procedure.

4. The touch display of the present invention is capable of utilizing a voltage biasing technique to promote the reliability of touch detection.

5. The touch display of the present invention is capable of providing dual touch planes.

6. The touch display of the present invention is capable of simplifying the structure of a touch screen to reduce the depth, increase the yield rate, and lower down the cost thereof.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch display having advanced-fringe-field-switching liquid crystal structure, including a pixel cell and a multiplexer circuit for providing a display function and a touch detection function, said pixel cell comprising:
   a first substrate;
   a counter electrode located on said first substrate;
   a counter electrode connection line coupled electrically with said counter electrode;
   an insulation layer located on said counter electrode;
   a thin film transistor located on said insulation layer and having a gate, a source, and a drain;
   a pixel electrode located on said insulation layer and coupled electrically with said drain;
   a gate connection line coupled electrically with said gate;
   a source connection line coupled electrically with said source; and
   a liquid crystal layer located on said thin film transistor, on said pixel electrode, and on said insulation layer; and
   said multiplexer circuit comprising:
   a first multiplexer having a first contact, a second contact, and a third contact, wherein, said first contact is coupled with said source connection line, said second contact is coupled with a source driver unit, said third contact is coupled with a touch control unit, said first contact is coupled electrically with said second contact during a display period, and said first contact is coupled electrically with said third contact during a touch detection period; and
   a second multiplexer having a fourth contact, a fifth contact, and a sixth contact, wherein, said fourth contact is coupled with said counter electrode connection line, said fifth contact is coupled with a common voltage, said sixth contact is coupled with said touch control unit, said fourth contact is coupled electrically with said fifth contact during said display period, and said fourth contact is coupled electrically with said sixth contact during said touch detection period.

2. The touch display having advanced-fringe-field-switching liquid crystal structure as claim 1, wherein said pixel cell further comprises:

a protection electrode on said liquid crystal layer; and a protection electrode connection line coupled electrically with said protection electrode and with said touch control unit.

3. The touch display having advanced-fringe-field-switching liquid crystal structure as claim 1, wherein said pixel cell further comprises a second substrate on said liquid crystal layer.

4. The touch display having advanced-fringe-field-switching liquid crystal structure as claim 2, wherein said pixel cell further comprises a second substrate on said protection electrode.

5. A touch display having advanced-fringe-field-switching liquid crystal structure, comprising:

a pixel array having plural external source connection lines, plural external gate connection lines, at least one external counter electrode connection line, and plural pixel cells, each of said plural pixel cells comprising:

a first substrate;

a counter electrode located on said first substrate;

a counter electrode connection line coupled electrically with said counter electrode and with one of said at least one external counter electrode connection line;

an insulation layer located on said counter electrode;

a thin film transistor located on said insulation layer and having a gate, a source, and a drain;

a pixel electrode located on said insulation layer and coupled electrically with said drain;

a gate connection line coupled electrically with said gate and with one of said plural external gate connection lines;

a source connection line coupled electrically with said source and with one of said plural external source connection lines; and a liquid crystal layer located on said thin film transistor, on said pixel electrode, and on said insulation layer;

a gate driver unit coupled with said plural external gate connection lines;

a multiplexer circuit having a first multiplexer coupled with said plural external source connection lines and a second multiplexer coupled with said at least one external counter electrode connection line;

a source driver unit coupled with said multiplexer circuit; and a touch control unit coupled with said multiplexer circuit;

wherein said multiplexer circuit couples said source driver unit with said plural external source connection lines and with said at least one external counter electrode during a display period, and couples said touch control unit with said plural external source connection lines and with said at least one external counter electrode during a touch detection period.

6. The touch display having advanced-fringe-field-switching liquid crystal structure as claim 5, wherein said touch control unit performs a touch detection procedure during said touch detection period, said touch detection procedure being selected from a group consisting of a self-capacitor touch detection procedure, a mutual-capacitor touch detection procedure, and any combination thereof.

7. The touch display having advanced-fringe-field-switching liquid crystal structure as claim 5, wherein each of said plural pixel cells further comprises a second substrate on said liquid crystal layer.

8. A touch display having advanced-fringe-field-switching liquid crystal structure, comprising:

a pixel array having plural external source connection lines, plural external gate connection lines, at least one external counter electrode connection line, plural external protection electrode connection lines, and plural pixel cells, each of said plural pixel cells comprising:

a first substrate;

a counter electrode located on said first substrate;

a counter electrode connection line coupled electrically with said counter electrode and with one of said at least one external counter electrode connection line;

an insulation layer located on said counter electrode;

a thin film transistor located on said insulation layer and having a gate, a source, and a drain;

a pixel electrode located on said insulation layer and coupled electrically with said drain;

a gate connection line coupled electrically with said gate and with one of said plural external gate connection lines;

a source connection line coupled electrically with said source and with one of said plural external source connection lines;

a liquid crystal layer located on said thin film transistor, on said pixel electrode, and on said insulation layer;

a protection electrode located on said liquid crystal layer; and a protection electrode connection line coupled electrically with said protection electrode and with one of said plural external protection electrode connection lines;

a gate driver unit coupled with said plural external gate connection lines;

a multiplexer circuit having a first multiplexer coupled with said plural external source connection lines, and said plural external protection electrode connection lines, and a second multiplexer coupled with said at least one external counter electrode connection line;

a source driver unit coupled with said multiplexer circuit; and a touch control unit coupled with said multiplexer circuit;

wherein said multiplexer circuit couples said plural external protection electrode connection lines with said touch control unit, couples said source driver unit with said plural external source connection lines and with said at least one external counter electrode connection line during a display period, and couples said touch control unit with said plural external source connection lines and with said at least one external counter electrode connection line during a touch detection period.

9. The touch display having advanced-fringe-field-switching liquid crystal structure as claim 8, wherein said touch control unit performs a touch detection procedure during said touch detection period, said touch detection procedure being selected from a group consisting of a self-capacitor touch detection procedure, a mutual-capacitor touch detection procedure, and any combination thereof.

10. The touch display having advanced-fringe-field-switching liquid crystal structure as claim 8, wherein each of said plural pixel cells further comprises a second substrate on said protection electrode.

* * * * *